Sept. 2, 1969             F. M. EVANS             3,464,515
INFLATABLE ESCAPE CHUTES FOR AIRCRAFT
Filed Feb. 12, 1968             3 Sheets-Sheet 1
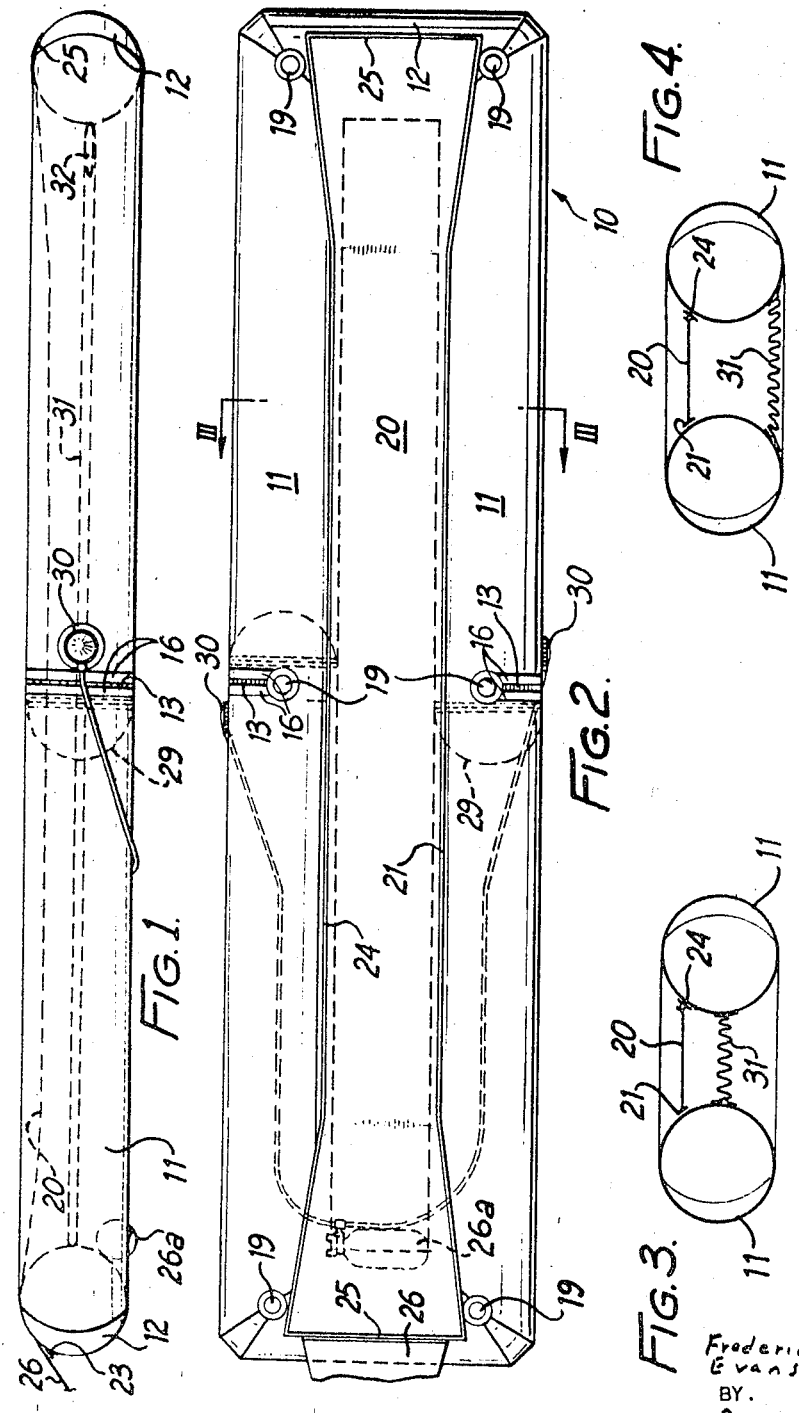
INVENTOR:
Frederick Maurice Evans
BY.
Bierman & Bierman

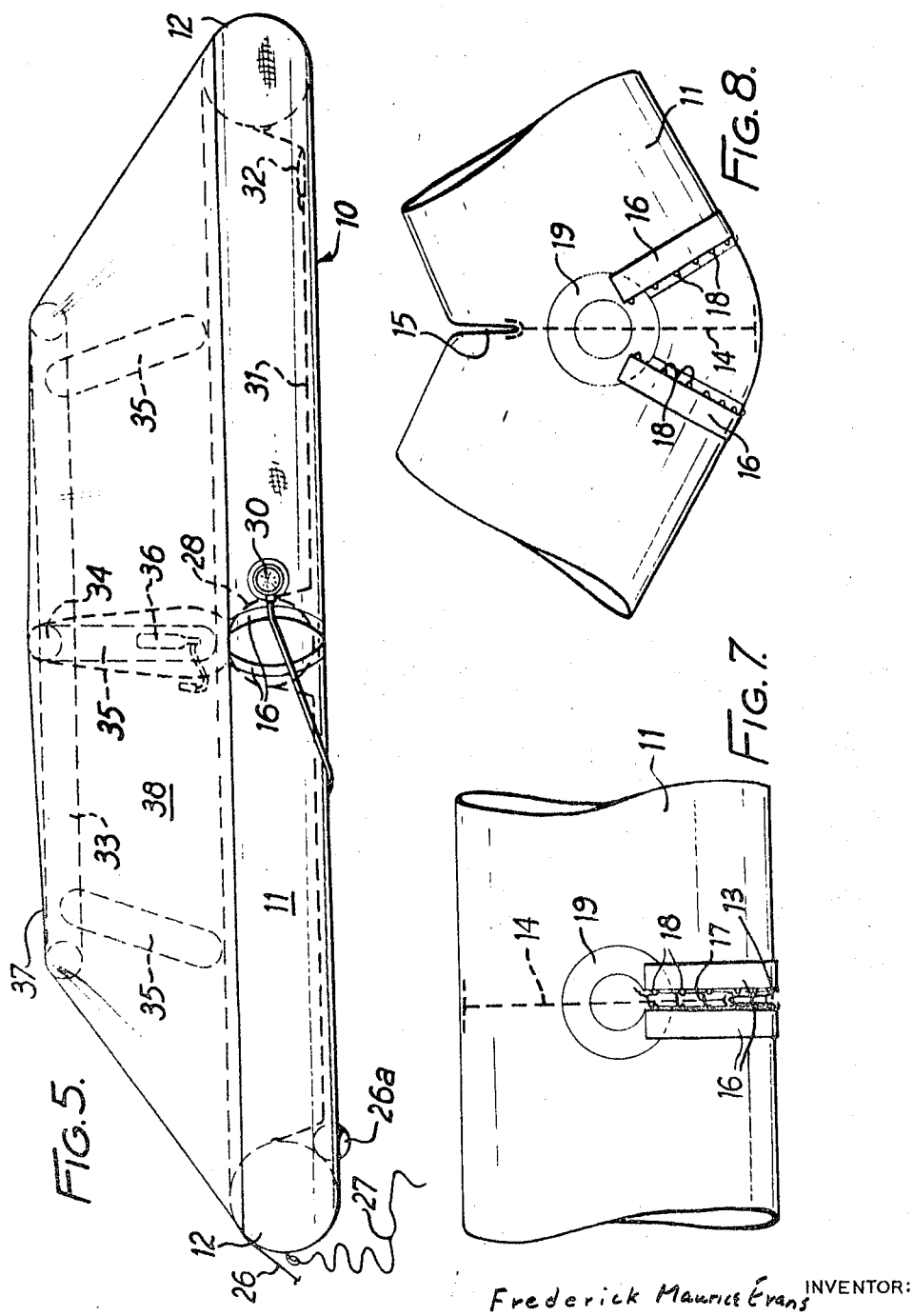

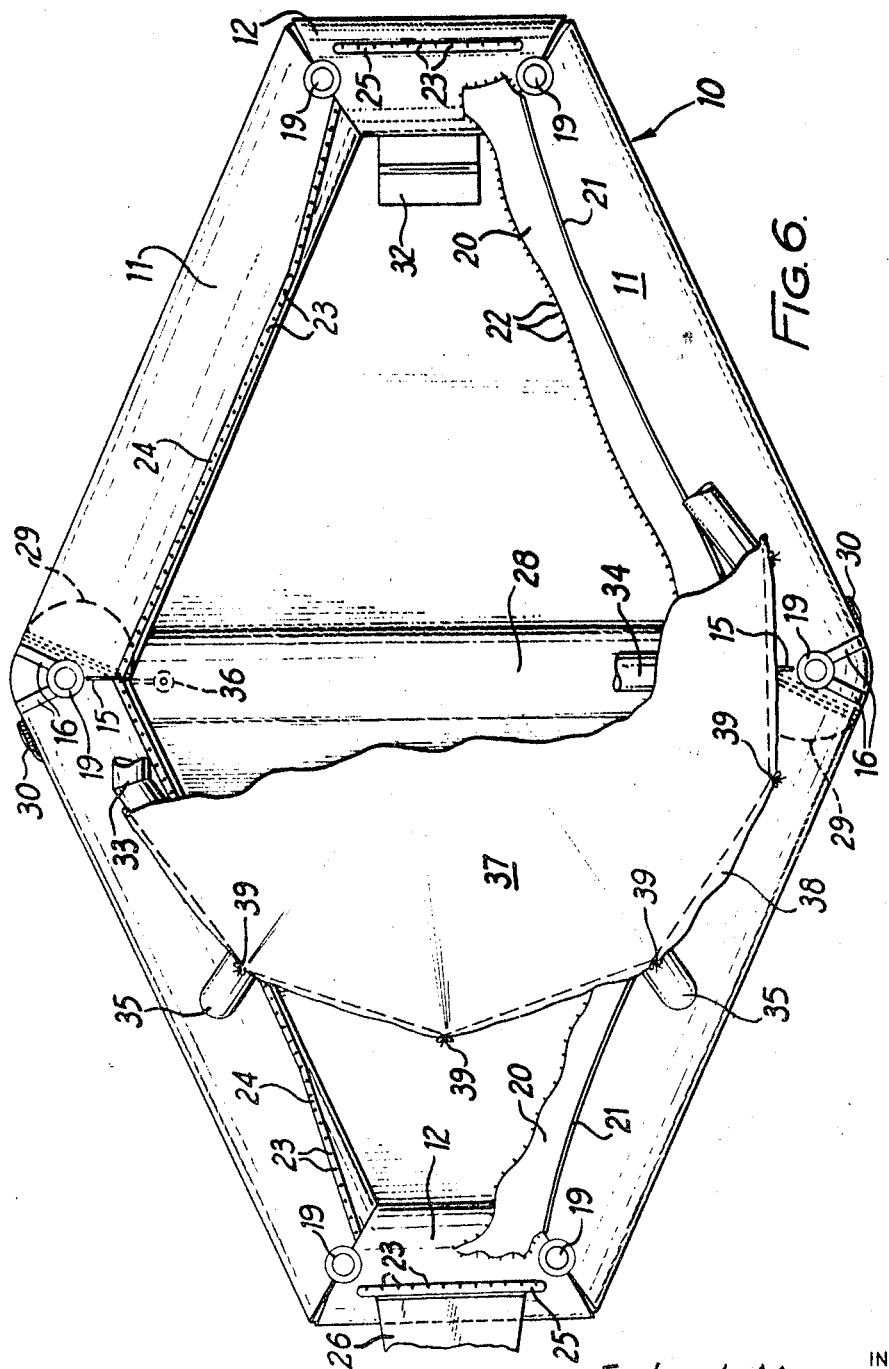

United States Patent Office 3,464,515
Patented Sept. 2, 1969

3,464,515
INFLATABLE ESCAPE CHUTES FOR AIRCRAFT
Frederick M. Evans, Wallasey, England, assignor to
Frankenstein Group Limited, a British company
Filed Feb. 12, 1968, Ser. No. 704,875
Claims priority, application Great Britain, Feb. 14, 1967,
6,960/67
Int. Cl. A62b *1/20;* B65g *11/10;* B63b *7/08*
U.S. Cl. 182—20                                7 Claims

ABSTRACT OF THE DISCLOSURE

A collapsible escape slide for extension from an aircraft doorway in emergency comprises a closed loop of flexible tubes adapted on inflation to produce an elongated rectangular frame with substantial rigidity in a direction perpendicular to the general plane thereof, a panel of flexible material attached along one side of said frame and releasably secured to the ends and other side thereof to form a floor for said slide, whose side tubes are each adapted for articulation in the general plane aforesaid, a flexible thwart tube connecting the mid-points of said tubes and adapted, on inflation, to bow said side tubes outwardly, and a second flexible floor permanently united to said frame to constrain the latter to a substantially oval planform when laterally extended as aforesaid, the slide being thus converted into a liferaft. At each articulation point, the frame tubing may have one side thereof connected by an internal web to an inward fold at the other side, and during normal use of the slide undesired articulation at any such point can be prevented by temporarily fastening opposite sides of said inward fold together. After conversion of the slide into a liferaft, the latter may be equipped with a protective flexible canopy supported upon a separate inflatable superstructure comprising a ring tube with dependent strut tubes whose free ends are securable to the raft gunwale, such canopy and superstructure being initially stowed in a pouch at one end of the raft floor.

---

This invention relates to collapsible slides adapted to be extended by inflation and thereafter to expedite emergency disembarkation of the occupants of aircraft whilst the latter are not actually airborne.

The need for such a slide may arise, for example, should an outbreak of fire appear imminent before take-off or after landing, or if undercarriage failure should result in the aircraft coming to rest in a pronounced nose-down attitude such that its passenger doorway is elevated beyond the reach of any staircase or ladder available at the landing area.

The conventional inflatable escape slide comprises a tubular floor, say 20 feet in length, which may be of square section when inflated or be formed of a number of parallel tubes, its lateral edges being united along their full lengths to two side tubes whose inflation causes them to assume upstanding positions and to form the walls of a shallow trough. This tubular structure is anchored, or adapted for anchorage, to an aircraft doorway and is stowed in deflated condition adjacent the latter, being designed for automatic and rapid self-inflation when jettisoned.

It is mandatory at the present time for any large civil aircraft to be provided with an escape slide at each passenger doorway and, for overseas flights, also with a sufficient number of inflatable liferafts to accommodate its whole complement in the event of an emergency landing in water.

The weight of the escape slides and liferafts required for, say, a 100-passenger aircraft, together with the stowage space which they occupy, makes highly desirable a dual-purpose appliance which can be utilized as either an escape slide or a liferaft as circumstances may dictate.

In the specification of my prior British patent application No. 36,307/64 (Ser. No. 1,080,234) I have described and claimed a collapsible aircraft escape slide comprising an elongated inflatable floor and semi-elliptical side walls bounded by arched tubes whose ends are hingedly attached adjacent the corners of the floor, the crests of such arches being releasably connected together so that their inflation tensions the floor and imparts longitudinal rigidity to the structure which will, however, automatically extend itself laterally upon release of the connection between said arches so that the latter becomes part of the gunwale of a liferaft whose floor is represented by the base and side walls of the original slide.

The object of the present invention is to provide an alternative and improved construction of combined escape and survival appliance which, when in slide form, will provide a clearer passage for escaping personnel and offer less resistance to lateral wind pressure.

According to this invention, a collapsible escape slide for an aircraft comprises a closed loop of flexible tubes adapted on inflation to produce an elongated rectangular frame with substantial rigidity in a direction perpendicular to the general plane thereof, a panel of flexible material attached along one side of said tubular frame and releasably securable to the ends and other side thereof to form the slide floor, the frame side tubes being each adapted at one or more points for articulation in the general plane of said frame, a flexible thwart tube connecting the mid-parts of said side tubes and adapted, on inflation therefrom and after release of said slide floor, to bow said side tubes outwardly and thereby extend said frame laterally to form a liferaft gunwale, and a second flexible floor permanently united at its edges to said frame to constrain the latter to a substantially oval profile.

Provision may be made for the attachment to the raft gunwale of a separate, inflatable tubular superstructure for supporting a protective flexible canopy.

In the accompanying drawings:

FIG. 1 is a side elevation of the dual-purpose appliance in use as an escape slide;

FIG. 2 is a plan view of the appliance in the same condition;

FIG. 3 is a section on the line 3—3 of FIG. 2;

FIG. 4 is a view corresponding to FIG. 3 but showing an alternative construction;

FIGS. 5 and 6 are views corresponding respectively to FIGS. 1 and 2 but showing the appliance in use as a liferaft; and FIGS. 7 and 8 are fragmentary enlargements of details of FIGS. 2 and 6 respectively.

In the example illustrated in FIGS. 1 to 3, the escape-slide frame 10 measures 18 feet 3 inches long by 4 feet 8 inches wide overall and comprises side and end tubes 11, 12 which are produced in known manner from a flexible impermeable material (such as rubberised fabric) for inflation to a circular cross-section of 1 foot 7 inches diameter.

At each corner of the resultant rectangular structure, the intercommunicating extremities of the side and end tubes 11, 12 are connected together in a manner which will permit their free relative movement through some 30 degrees in the general plane of the frame 10, and outward lateral flexibility through some 60 degrees is similarly provided at the mid-point of each side tube 11.

Conveniently this capacity for articulation of the tubular frame 10 is achieved, as shown in FIGS. 7 and 8, by making up the juxtaposed parts of the latter in such manner as to provide a deep inward fold 13 at one side of the tube, whose opposite side is connected to the edge of this fold by an internal web 14. Thus, on relative angular movement of the frame parts in a manner to absorb the excess material of the fold 13, the opposite side of the tube acquires a similar inward fold 15 under the pull of the web 14.

In the case of the central joints of the frame side tubes 11, the initial folds 13 are provided at the outer sides of the latter and positively retained by means of quickly-releasable fastenings, so that the tubes 11 have no capacity for articulation but remain parallel to one another, and at right angles to the short end tubes 12, when inflated to (say) 2½ p.s.i.

In the preferred arrangement illustrated, strips 16 of flexible material are secured around the outer part of each tube's circumference at opposite sides of the adjacent fold 13, which is maintained by Dutch lacing 17 connecting rows of loops 18 eyelets along the inner edges of such strip. Circular reinforcing patches 19 may be cemented to the top and bottom of the tube 11 at the ends of these lacing strips 16, and at each corner joint.

The floor of the slide is constituted by a panel 20 of flexible material which for the most part has a uniform width somewhat greater than that of the gap between the side tubes 11 but is broadened at both ends and long enough to extend beyond the tops of the end tubes 12.

This floor panel 20 has one lateral edge permanently secured to the slide frame 10 at 21, its other lateral edge and both ends being provided with spaced loops 22 or eyelets adapted to be temporarily attached by Dutch lacing to correspondingly spaced loops 23 on flexible strips 24, 25 fixed along the other side and ends, respectively, of the frame 10. One of the end strips 25 is united to an extension panel 26 which is detachably connected, by quick-release couplings (not shown), to the sill, and if desired to the sides also, of an aircraft doorway.

The slide above described is intended to be stowed in deflated and folded condition within a fabric valise or rigid container disposed inside the doorway aforesaid and coupled thereto as aforesaid, so that it will hang suspended when jettisoned. This operation tensions a trip-line connected to release mechanism associated with a bottle or bottles 26 of compressed gas at the anchored end of the slide, which thereupon self-inflates with aspiration of external air in known manner, bursting open the securing means of the valise or container, and extending itself in a downwardly-inclined position with its lower end resting on the ground, or floating on the water, as the case may be.

In the case of a "wet" landing, the slide is quickly convertible into a liferaft by releasing its attachments to the aircraft and allowing it to drop into the water at the end of a painter line 27 whose tensioning may serve to release the laces holding the slide floor 20 in position and the fastenings 17 which previously prevented flexure of the side tubes 11.

The inflating medium in the latter is then able to enter a thwart tube 28 (say, 9 feet 6 inches in lengths by 1 foot inflated diameter) whose ends intercommunicate with the side tubes 11 at their hinge regions, so that the latter are forced outwards by inflation of the thwart 28, the corner joints deflecting simultaneously, until the frame 10 assumes a generally oval or blunted diamond profile with overall dimensions 16 feet 8 inches long by 11 feet 8 inches wide.

Preferably each side tube 11 has a transverse baffle 29 adjacent its hinge region, the thwart tube 28 being similarly divided and the parts thereof connected to opposite halves of the frame 10 so that the latter provides two adjoined but separate chambers which are respectively inflatable through valves 30 at opposite sides of the frame and enable the raft to remain buoyant should either part thereof be damaged or lose pressure for any reason.

The planform of the appliance when thus extended is defined by means of a flexible raft floor 31 initially stowed in folded condition beneath the detachable slide, floor 20 and marginally united to the inner periphery of the tubular frame 10, which now becomes the raft gunwale and provides adequate buoyancy for a complement of 25 persons, despite the fact that its internal pressure may be reduced to some 1½ p.s.i. by the inflation of the thwart tube 28 therefrom.

As illustrated, the edges of the raft floor 31 are secured to the frame 10 in a plane containing the axes of its constituent tubes 11, 12, so that the raft can be used either way up, but if reversibility is not required the floor 31 may be united to the lower parts of the tubes as shown in FIG. 4.

The discarded slide floor 20 can be rolled up and stowed within the raft, whose occupants may be protected by means of a separately-inflatable canopy structure normally stowed in a sealed compartment 32 at that end of the raft floor 31 which is lowermost when the appliance is employed as a slide, so that it forms a protective buffer between users of the latter and the adjacent end tube 12.

The canopy structure comprises an endless flexible ring tube 33 having an octagonal or circular profile of somewhat smaller dimensions than that of the raft and provided with a cross tube 34 adapted for disposal directly above the thwart tube 28 of the raft, as well as with outwardly-inclined strut tubes 35 which depend from the ends of the cross-tube 34 and at other positions, their free ends being detachably securable to anchorage points on the raft gunwale so that the ring tube 33 is supported at a suitable height above the latter. Inflation may be effected by means of a small bottle 36 of compressed gas, assisted by air aspiration.

The canopy proper consists of a sheet 37 of impermeable fabric permanently united to the octagonal or other ring tube 33 so as to be tensioned by inflation of the latter, and having side curtains 38 which may be brailed up, or lashed down to the raft gunwale outside the strut tubes 35, by means of tapes 39.

Erection of the canopy structure will normally be effected after the raft has been bowsed alongside the "ditched" aircraft for boarding.

I claim:
1. A collapsible escape slide for an aircraft, comprising a closed loop of flexible tubes adapted on inflation to produce an elongated rectangular frame with substantial rigidity in a direction perpendicular to the general plane thereof, a panel of flexible material attached along one side of said tubular frame and releasably secured to the ends and other side thereof to form a floor for said slide, the side tubes of said frame being each adapted for articulation in the general plane aforesaid, a flexible thwart tube connecting the mid-points of said side tubes and adapted, on inflation therefrom and after release of said slide floor, to bow said side tubes outwardly and thereby extend said frame laterally to form a liferaft gunwale, and a second flexible floor permanently united at its edges to said frame to constrain the latter to a substantially oval platform.

2. A collapsible escape slide according to claim 1, wherein said rectangular frame has provision for articulation at the corners thereof.

3. A collapsible escape slide according to claim 1, wherein the frame tubing has an internal web connecting one side thereof to an inward fold at the other side whenever a capacity for articulation is required.

4. A collapsible escape slide according to claim 1, wherein at each articulation point in a side tube of the frame an internal web connects one side of said tube to an inward fold at the other side thereof, and means are provided for preserving said fold by temporarily fastening opposite sides thereof together.

5. A collapsible escape slide according to claim 1, in combination with a protective flexible canopy and a separate inflatable tubular superstructure for supporting said canopy above said slide after conversion of the latter into a liferaft.

6. A collapsible escape slide according to claim 1, in combination with a separate inflatable ring tube, strut tubes depending from said ring tube and attachable at their free ends to the frame of said slide after conversion of the latter into a liferaft, and a protective flexible canopy permanently united to said ring tube and adapted to cover said strut tubes on inflation of the latter from said ring tube.

7. A collapsible escape slide according to claim 1, wherein a stowage pouch is provided on said second flexible floor at whichever will be the outboard end of said slide in use, in combination with a protective flexible canopy and a separate inflatable tubular superstructure for mounting upon said tubular frame after conversion of said slide into a liferaft, said canopy and superstructure being stowable in said pouch.

References Cited
UNITED STATES PATENTS

| | | |
|---|---|---|
| 2,396,212 | 3/1946 | Spanel _____ 9—2 |
| 2,444,859 | 7/1948 | Sturtevant _____ 9—2 |
| 3,070,203 | 12/1962 | Hailstone. |
| 3,092,232 | 6/1963 | Adams. |
| 3,092,854 | 6/1963 | Manhart _____ 9—11.1 |

REINALDO P. MACHADO, Primary Examiner

U.S. Cl. X.R.

9—2; 193—25